US008340684B2

(12) United States Patent
Miura

(10) Patent No.: US 8,340,684 B2
(45) Date of Patent: Dec. 25, 2012

(54) MOBILE STATION

(75) Inventor: Takanori Miura, Yokohama (JP)

(73) Assignee: Kyocera Corporation, Kyoto (JP)

( * ) Notice: Subject to any disclaimer, the term of this patent is extended or adjusted under 35 U.S.C. 154(b) by 162 days.

(21) Appl. No.: 12/832,008

(22) Filed: Jul. 7, 2010

(65) Prior Publication Data

US 2011/0009068 A1  Jan. 13, 2011

(30) Foreign Application Priority Data

Jul. 8, 2009  (JP) ................................ 2009-161401

(51) Int. Cl.
*H04W 24/00* (2009.01)
*H04B 17/00* (2006.01)
(52) U.S. Cl. .................. 455/456.1; 455/67.11
(58) Field of Classification Search ............... 455/67.11, 455/456.1, 456.5, 456.6; 375/349
See application file for complete search history.

(56) References Cited

U.S. PATENT DOCUMENTS 7,203,501 B2 * 4/2007 Kim et al. .................. 455/456.1
7,519,136 B2 * 4/2009 Qi et al. ..................... 375/349
8,040,279 B2 * 10/2011 Jo .............................. 342/420

FOREIGN PATENT DOCUMENTS

JP   2007-043343   2/2007
WO  WO-2009/041597  4/2009

OTHER PUBLICATIONS

Tango et al., "Simplified Prediction Scheme of Propagation Loss over Non Line-of-Sight Intersections in V2V Communications" The Institute of Electronics, Information and Communication Engineers, A.P2007-173 (Mar. 2008).

* cited by examiner

*Primary Examiner* — Nay A Maung
*Assistant Examiner* — Chung-Tien Yang
(74) *Attorney, Agent, or Firm* — Duane Morris LLP

(57) ABSTRACT

A method of estimating a location of a mobile station is disclosed. A received signal strength of a signal transmitted from a base station is measured. Based on the received signal strength, determination is made whether a signal propagation path to the base station is non-line-of-sight. If the signal propagation path is non-line-of-sight, a distance to the base station is estimated based on a propagation model of the base station.

17 Claims, 11 Drawing Sheets

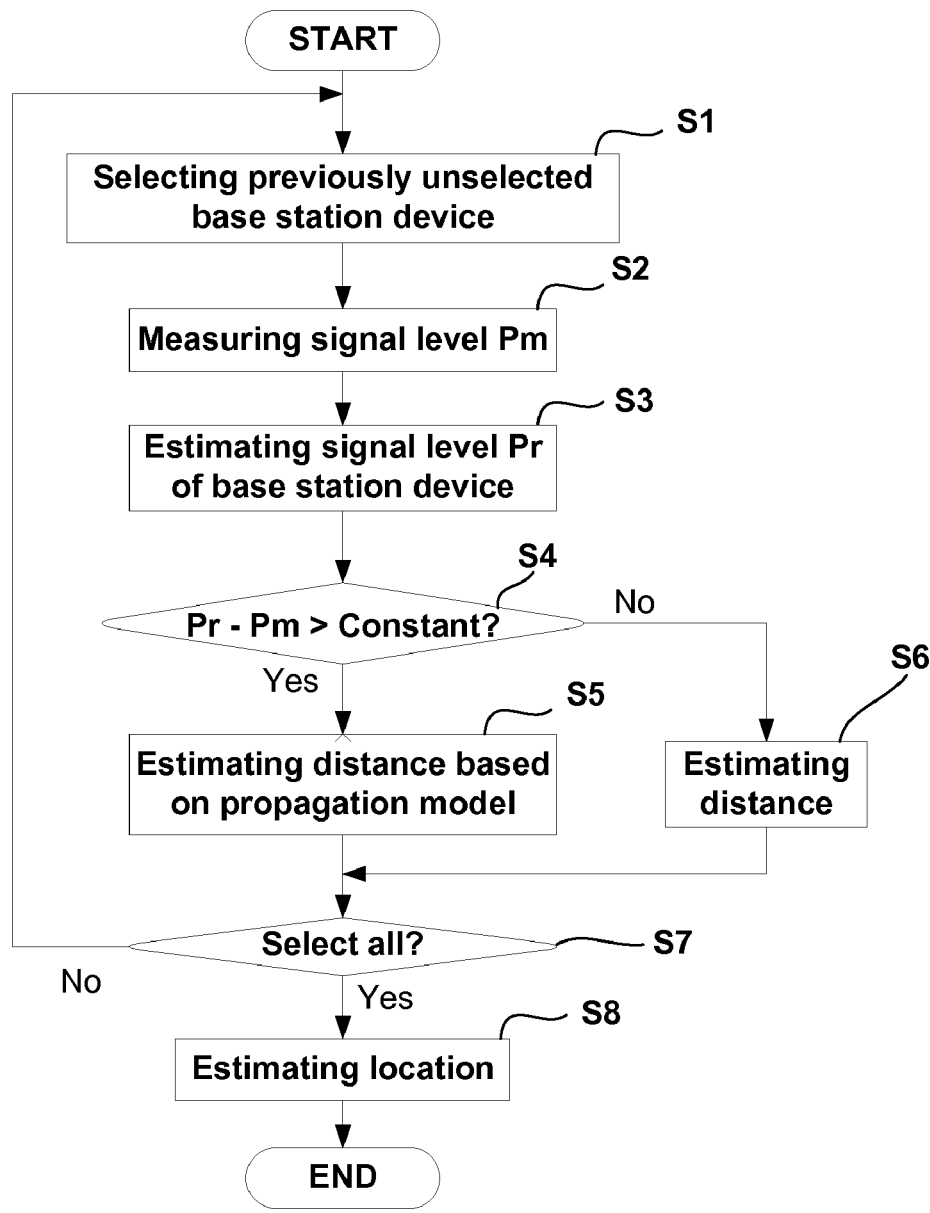

MOBILE STATION

CROSS-REFERENCE TO RELATED APPLICATION

The present application claims priority under 35 U.S.C. §119 to Japanese Patent Application No. 2009-161401, filed on Jul. 8, 2009, entitled "MOBILE STATION DEVICE AND METHOD FOR ESTIMATING DISTANCE". The content of which is incorporated by reference herein in its entirety.

FIELD

Embodiments of the present disclosure relate generally to mobile station, and more particularly relate to a mobile phone terminal and distance estimation.

BACKGROUND

In a mobile communication system comprising a mobile station and a base station, a distance between the mobile station and the base station may be estimated by measuring a received signal strength at the mobile station and the base station. For example, distances between a personal handy phone system (PHS), and one or more base stations can be estimated by mounting a PHS on a moving device and measuring a strength of signals received at the PHS and transmitted through a propagation path from the base stations in a surrounding area. If the propagation path comprises no obstacles it is referred to as Line-Of-Sight (LOS), and if the propagation path comprises obstacles, it is referred to as Non-Line-Of-Sight (NLOS). The distance between a mobile station and a base station may be estimated, if the propagation path is LOS. However, if the propagation path is NLOS, a distance between the mobile station and the base station may be non-optimally estimated.

SUMMARY

A method of estimating a location of a mobile station is disclosed. A received signal strength of a signal transmitted from a base station is measured. Based on the received signal strength, determination is made whether a signal path to the base station is non-line-of-sight. If the signal path is non-line-of-sight, a distance to the base station is estimated based on a propagation model of the base station.

A first embodiment comprises a mobile station. The mobile station comprises a signal-measuring module operable to measure a received signal strength of at least one signal from at least one base station to obtain a measured received signal strength. The mobile station further comprises a determining module operable to determine, based on the measured received signal strength, whether a propagation path to the at least one base station is non-line-of-sight. The mobile station also comprises a distance-estimating module operable to estimate a distance to the at least one base station based on a propagation model of the at least one base station, if the propagation path is non-line-of-sight.

A second embodiment comprises a method of estimating a location of a mobile station that communicates with base stations. The method comprises measuring a first received signal strength of a signal transmitted from a first base station to obtain a measured first received signal strength, and determining whether a signal propagation path to the first base station is non-line-of-sight based on the measured first received signal strength. The method further comprises estimating a first distance to the first base station based on a propagation model of the first base station, if the signal propagation path is non-line-of-sight.

A third embodiment comprises a computer readable medium comprising program code for estimating a location of a mobile station. The program code comprises code for measuring a received signal strength of a signal transmitted from a first base station to obtain a measured first received signal strength. The program code further comprises code for determining whether a propagation path to the first base station is non-line-of-sight based on the measured first received signal strength, and estimating a first distance to the first base station based on the propagation model of the first base station, if the propagation path is non-line-of-sight.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale of the present disclosure.

FIG. 5 illustrates an exemplary flowchart showing a location finding process according to an embodiment of the disclosure.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure are described herein in the context of one practical non-limiting application, namely, a mobile station such as a mobile phone. Embodiments of the disclosure, however, are not limited to such mobile phones, and the techniques described herein may also be utilized in other applications. For example, embodiments may be applicable to a mobile communication system comprising a base station and devices such as: digital books, digital cameras, electronic game machines, digital music players, personal digital assistance (PDA), personal handy phone system (PHS), lap top computers, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
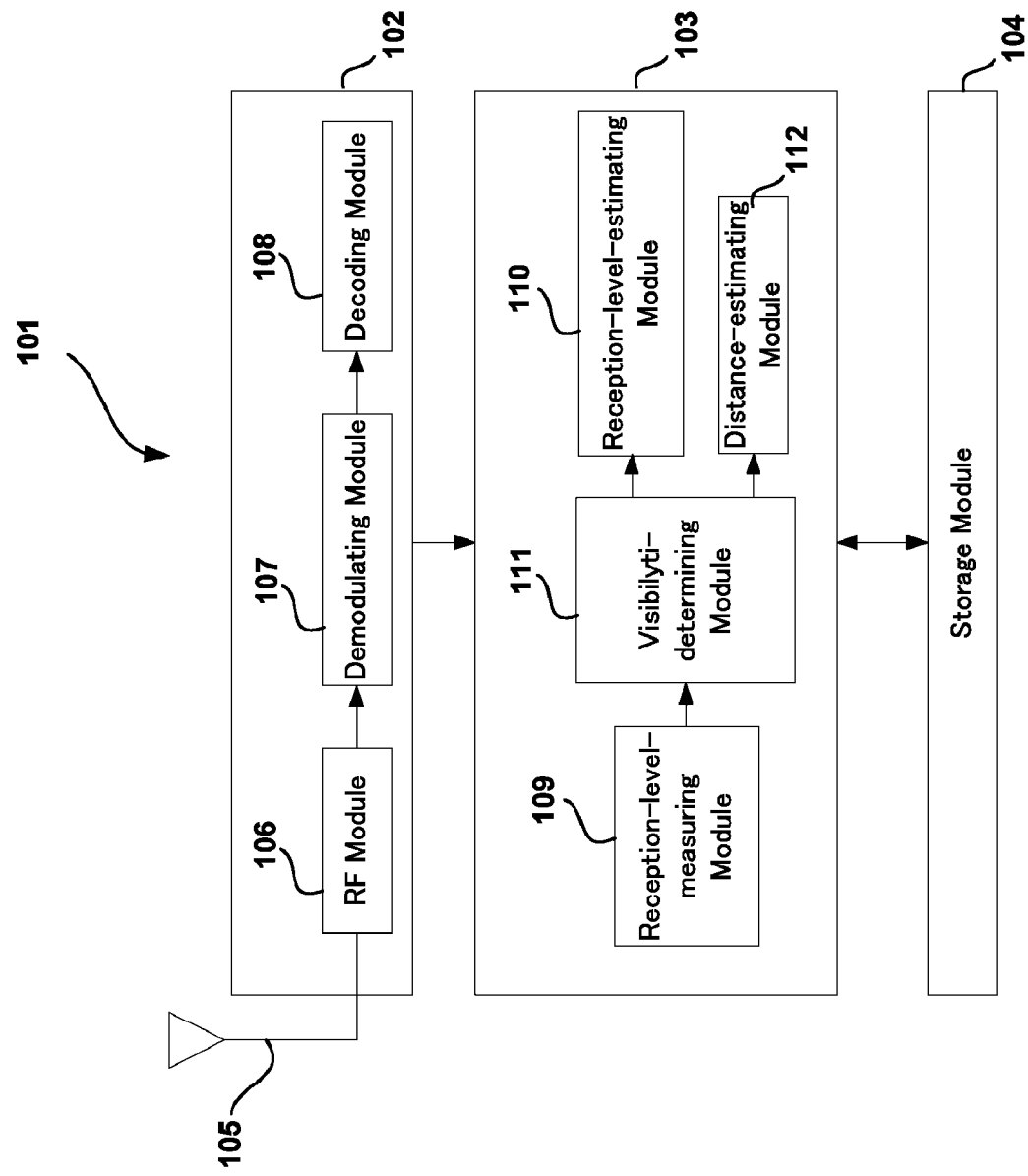
FIG. 1 illustrates an exemplary schematic functional block diagram of a mobile station according to an embodiment of the disclosure.

FIG. 1 illustrates an exemplary schematic functional block diagram of a mobile station 101 according to an embodiment of the disclosure. The mobile station 101 comprises a communication module 102, a control module 103, a storage module 104, and an antenna 105.

The mobile station 101 is operable to transmit and receive a plurality of communication signals comprising data signals via the communication module 102 transceiver (not shown). The communication module 102 is operable to carry out a radio communication with a network side device via a mobile communication network (not shown) such as a base station communicatively coupled to the mobile communication network (not shown). The communication module 102 transceiver communicates with a base station transceiver via a wireless data communication link (not shown). The communication module 102 transceiver cooperates with the base station transceiver with a suitably configured RF antenna arrangement such as the antenna 105 that can support a particular wireless communication protocol and modulation scheme. The communication module 102 modulates a transmitting signal from the control module 103 as a radio signal to the base stations such as base stations 201, 202, and 203 (FIG. 2) through the antenna 105 (upstream processing), and demodulates a radio signal received from the base station through the antenna 105 (downstream). The control module 103 receives the demodulated signal from the communication module 102. The communication module 102 comprises an RF module 106, a demodulating module 107, and a decoding module 108. The communication module 102 may comprise a semiconductor device, a computer (microprocessor) or another processor for performing processes of the mobile station 101.

The RF module 106 down-converts and amplifies signals output from the antenna 105. The demodulating module 107 conducts A/D conversion and/or demodulation of signals output from the RF module 106. The decoding module 108 decodes signals output from the demodulating module 107 and generates received data.

The control module 103 comprises a reception-level signal-measuring module 109, a reception-level-estimating module 110, a Line-Of-Sight (LOS) determination module 111, and a distance-estimating module 112 as explained in more detail below. The control module 103 may comprise transmission/reception of signals at the communication module 102. For example, the control module 103 may control operations of the mobile station 101 so that processes of the mobile station 101 are suitably performed. These processes comprise, for example but without limitation, signal strength measurements, transmission and reception of data signals, and the like. The data signals may comprise, for example but without limitation, propagation model data, voice data during voice communication, text data during email, and web data during accessing web site, and the like. The control module 103 also controls a communication of the communication module 102, and access to the storage module 104 such as access to the propagation model data.

The control module 103 may comprise a computer (microprocessor) or another processor for performing a process based on a program (operating system, application program, etc.) stored in the storage module 104. The application programs may comprise the reception level signal-measuring module 109, the reception level-estimating module 110, the LOS determination module 111, the distance-estimating module 112, and the like. The control module 103 may read instruction code sequentially from programs such as the operating system and the application program, which are stored in the storage module 104, and perform the programs. For example, location estimation methods in the control module 103 may be realized on the computer by one or a plurality of programs, or may be at least partially realized by hardware.

The reception level signal-measuring module 109 measures level of received signals (hereinafter referred to as "signal level Pm" or received signal strength interchangeably) when signals transmitted from a base station are received.

The reception level-estimating module 110 estimates the ideal signal level Pr of a signal sent to a base station. For example, the reception level-estimating module 110 estimates the ideal signal level Pr by using the transmission equation (1):

$$Pr=(GtGr(\lambda/(4\pi D)))^2 Pt \tag{1}$$

where, Pt is the transmission power of a base station, D is the distance between a transmission antenna of the base station and a receiving antennal of a mobile station, Gt is an absolute gain of the transmitting antenna of the base station, Gr is an absolute gain of the receiving antenna of the mobile station, and λ is the wavelength of the radio-frequency signal being transmitted.

Measurement of the signal level Pm by the reception level signal-measuring module 109 and the estimation of the signal level Pr by the reception level-estimating module 110 are conducted substantially simultaneously.

When a difference between the signal level Pm measured by the reception level signal-measuring module 109 and the signal level Pr estimated by the reception level-estimating module 110 exceeds a predetermined value, a propagation path is determined to be Non-Line-Of-Sight (NLOS) by the LOS determination module 111. When the difference is below the predetermined value, the propagation path is determined to be LOS by the LOS determination module 111.

When the propagation path is determined to be NLOS by the LOS determination module 111, the distance-estimating module 112 estimates the distance to the base station based on a propagation model (e.g., FIG. 3A-D) corresponding to the base station detected by the mobile station 101. The propagation model represents a relationship between the signal level and the distance from a base station to the mobile station 101.

In an embodiment, the distance-estimating module 112 uses a propagation model corresponding to a base station to which a distance from the mobile station 101 is to be estimated, and estimates the distance to the base station. For example, in a case of obtaining a distance to the base station 201, the distance-estimating module 112 uses a propagation model that corresponds to the base station 201 and estimates the distance to the base station 201. The propagation model corresponding to the base station 201 to which the distance from the mobile station 101 is to be estimated may be stored in the storage module 104.

The storage module 104 is operable to store various kinds of data used for various processes of the mobile station 101. In practical embodiments, the storage module 104 may comprise, for example but without limitation, a non-volatile storage device (non-volatile semiconductor memory, hard disk device, optical disk device, and the like), a random access storage device (for example, SRAM, DRAM), or any other form of storage medium known in the art. For example, the storage module 104 may store, a propagation model for each of the base stations, such as propagation models for the base stations 201, 202 and 203, which may be different from each other. Moreover, when base stations are searched by the mobile station 101 and a base station is found, the storage module 104 stores propagation models corresponding to combinations of each of the base stations. The storage module 104 may also store, a computer program which is executed by the control module 103, an operating system, an application program, tentative data used in executing a program processing, and the like. The storage module 104 may be coupled to the control module 103 such that the control module 103 can read information from and write information to storage module 104. As an example, the control module 103 and storage module 104 may reside in their respective ASICs. The storage module 104 may also be integrated into the control module 103. In an embodiment, the storage module 104 may comprise a cache memory for storing temporary variables or other intermediate information during execution of instructions to be executed by the control module 103. The storage module 104 may also comprise non-volatile memory for storing instructions to be executed by the control module 103.

The antenna 105 transmits outgoing signals output from the communication module 102 as radio waves, receives incoming signals transmitted from the surrounding base stations 201, 202, 203 (FIG. 2), and transmits the incoming signals to the communication module 102. That is, the antenna 105 functions as a transmitting antenna as well as a receiving antenna.

Figure 2:
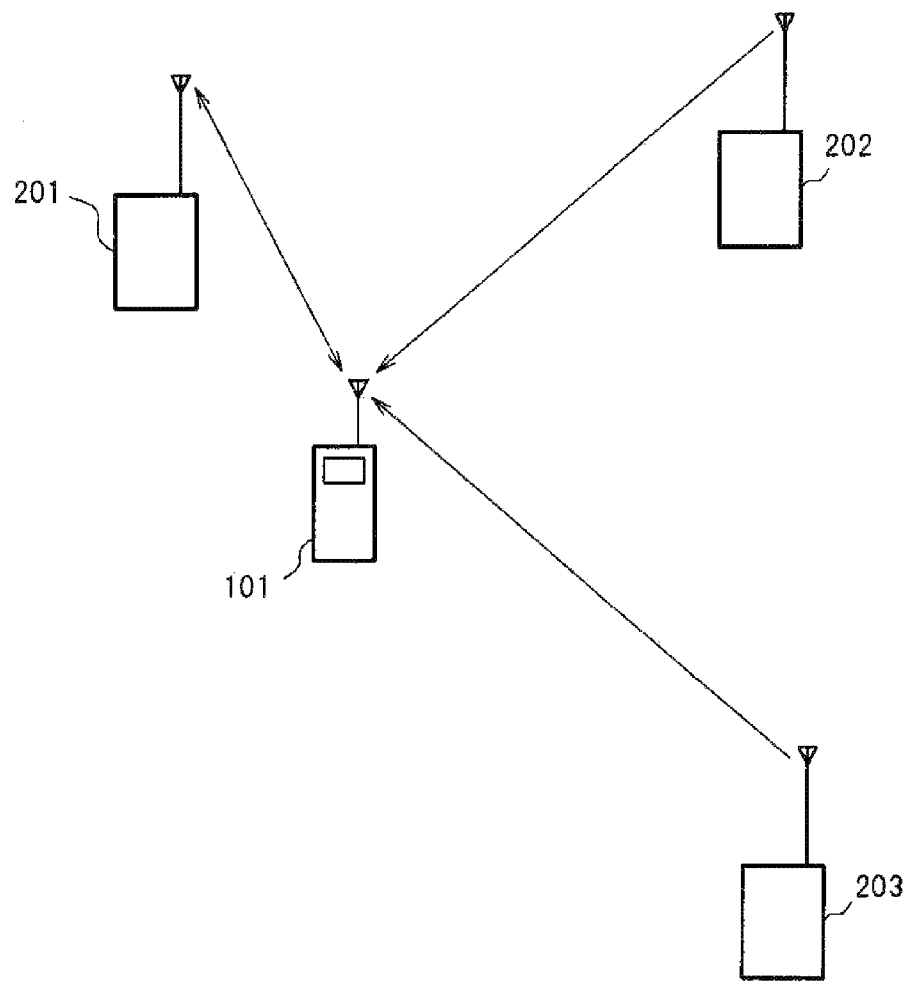
FIG. 2 illustrates an exemplary communication process conducted by a mobile station.

FIG. 2 illustrates an exemplary communication process that can be performed by the mobile station 101. The mobile station 101 communicates with the base station 201, and the base stations 202 and 203 in the proximity of the base station 201 transmit control signals received by the mobile station 101. A reception level when the mobile station 101 searches for a base station is the highest with the base station 201, whereas the reception level of the base station 202 and the base station 203 have the second and third highest reception levels respectively. The base stations 201, 202, and 203 are, for example but without limitation, base stations that can communicate with a PHS, and the like.

FIGS. 3A-3D illustrate exemplary graphs showing various propagation models. The horizontal axis represents the distance from a mobile station to a base station, and the vertical axis represents the reception level of signals (signal level) from the base station received at the mobile station (received signal strength). Waveforms such as reflected waves, diffracted waves, and reduced waves (FIGS. 4B-4D) are taken into consideration when determining a relationship between the signal level represented in the propagation model and the distance from a base station 201, 202, or 203 to the mobile station 101. The waveforms may be due to obstacles located between or around the mobile station and the base station 201, 202, or 203 and apriori determined for each base station 201, 202, or 203 through measurements or estimation.

Figure 3A:
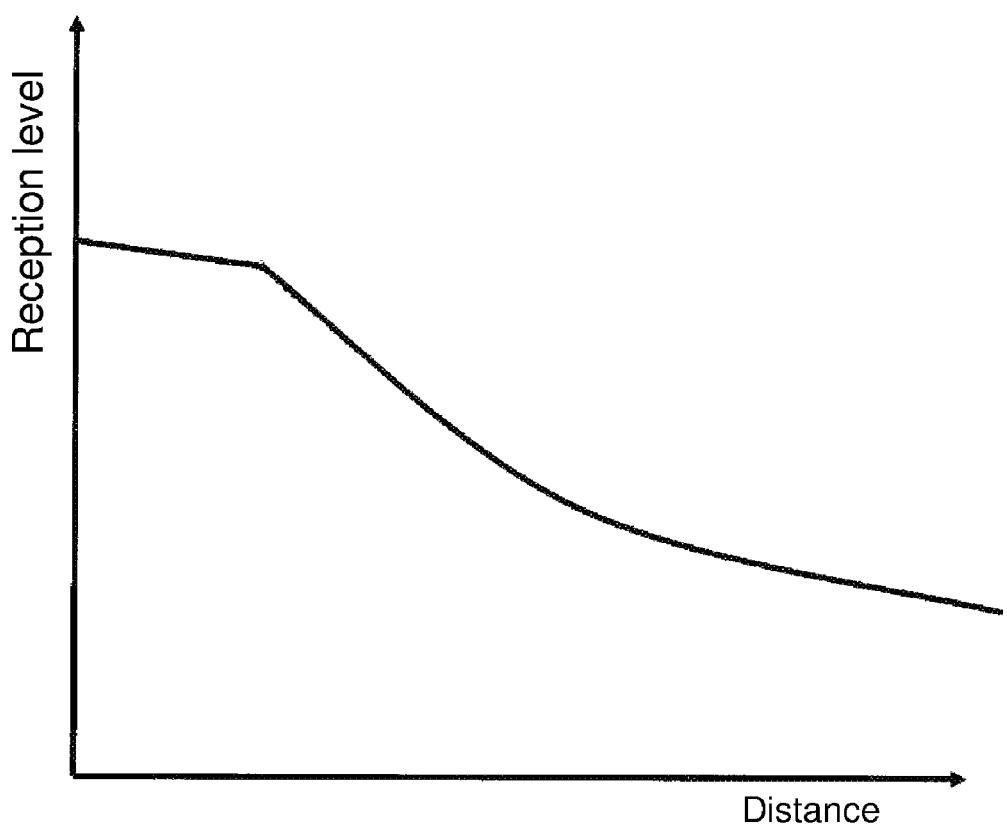
FIG. 3A-3D illustrates an exemplary graph showing a propagation model under Non-Line-Of-Sight (NLOS) conditions.

As indicated by a solid line in FIG. 3A, if the mobile station 101 is present at a spot that generates LOS conditions, the signal level is increased or decreased by a predetermined ratio in accordance with the distance to the base station 201. On the other hand, if the mobile station 101 is present at a spot that generates NLOS conditions, the signal level is increased or decreased by a ratio that is different from that used when the mobile station 101 is present at a spot where the signal level generates LOS conditions. This is due the reflection, diffraction, and reduction of radio waves (FIG. 4B-4D) due to obstacles such as buildings that may be present between the mobile station 1301 and the base station 1302 That is, if the mobile station 101 is present at a spot that generates NLOS conditions, the reception level of reflected waves, the reception level of diffracted waves, and the reception level of reduced waves of radio waves are taken into consideration for the relationship of the signal level and the distance from the mobile station 101 to the base station 201, 202, or 203. A method of estimating propagation loss in an NLOS is described in: Toshihiro Tango, et al. "A Study on a Method of Estimating Propagation Loss in an NLOS Intersection in Vehicle-to-Vehicle Communication", The Institute of Electronics, Information and Communication Engineers Technical Report, A-P2008-173 (March 2008), relevant content of which is incorporated by reference herein in its entirety.

Based on a relationship between the signal level represented as described by a propagation model and a distance from the base station 201, 202, or 203 to the mobile station 101, the distance-estimating module 112 estimates the distance to the base station using the signal level Pm measured by the reception-level-signal-measuring module 109.

Figure 3B:
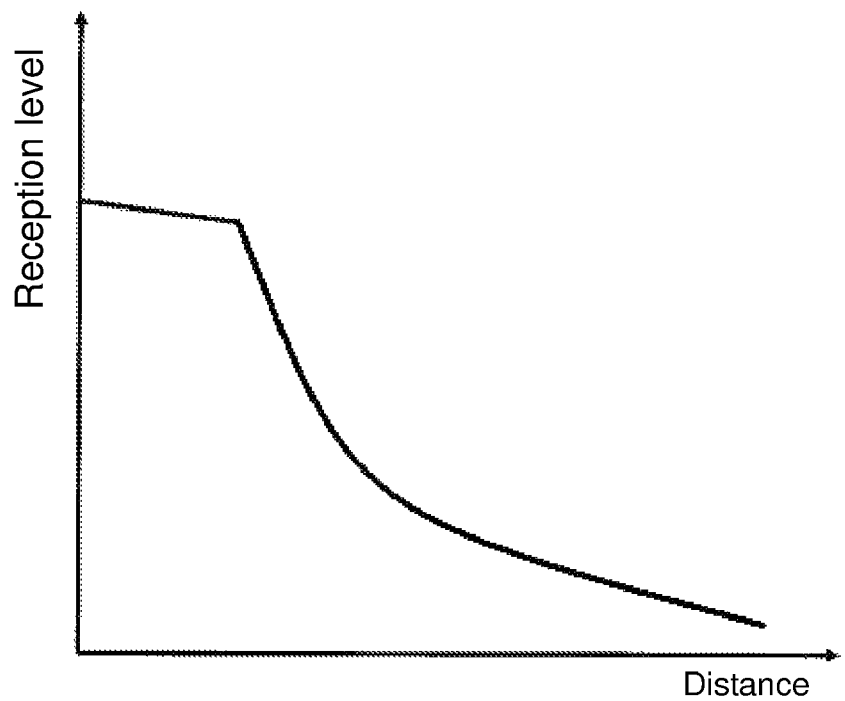
Figure 3C:
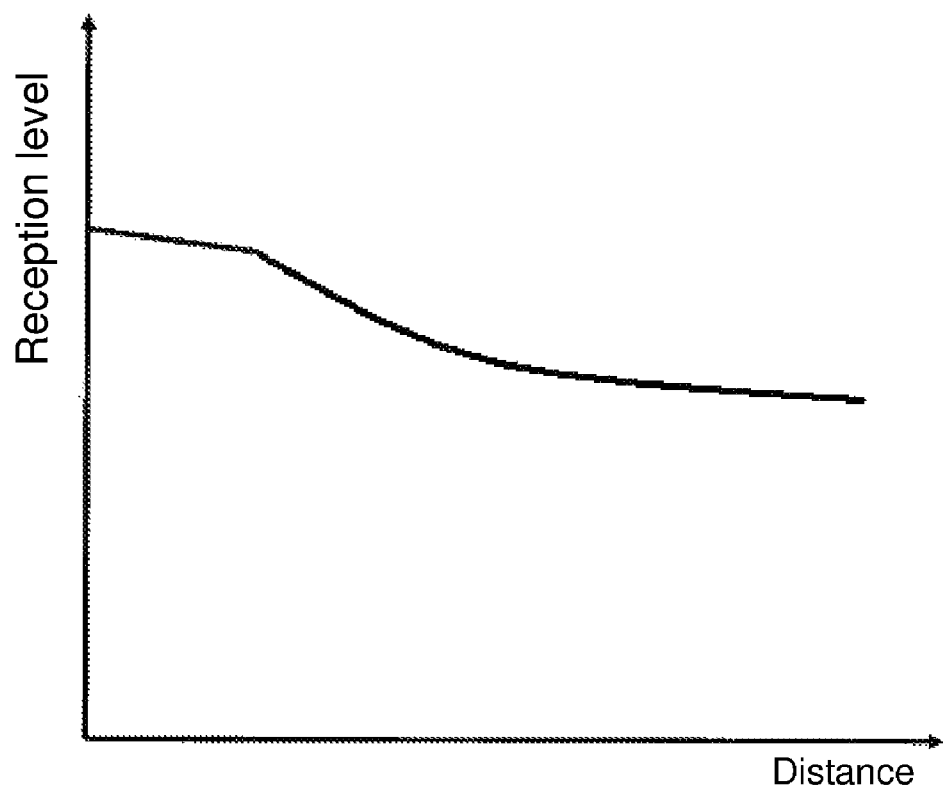

An area surrounding a base station and associated obstructions may vary with each base station; therefore, a state of reflection, diffraction, and reduction of radio waves may be different accordingly. FIGS. 3B and 3C show the characteristics of a propagation model at different base stations. In FIG. 3B, a reduction of the reception level as the distance between the mobile station and the base station becomes greater is more significant compared to FIG. 3A. In FIG. 3C, a reduction of the reception level as the distance between the mobile station and the base station becomes greater is minor compared to FIG. 3A.

Figure 3D:
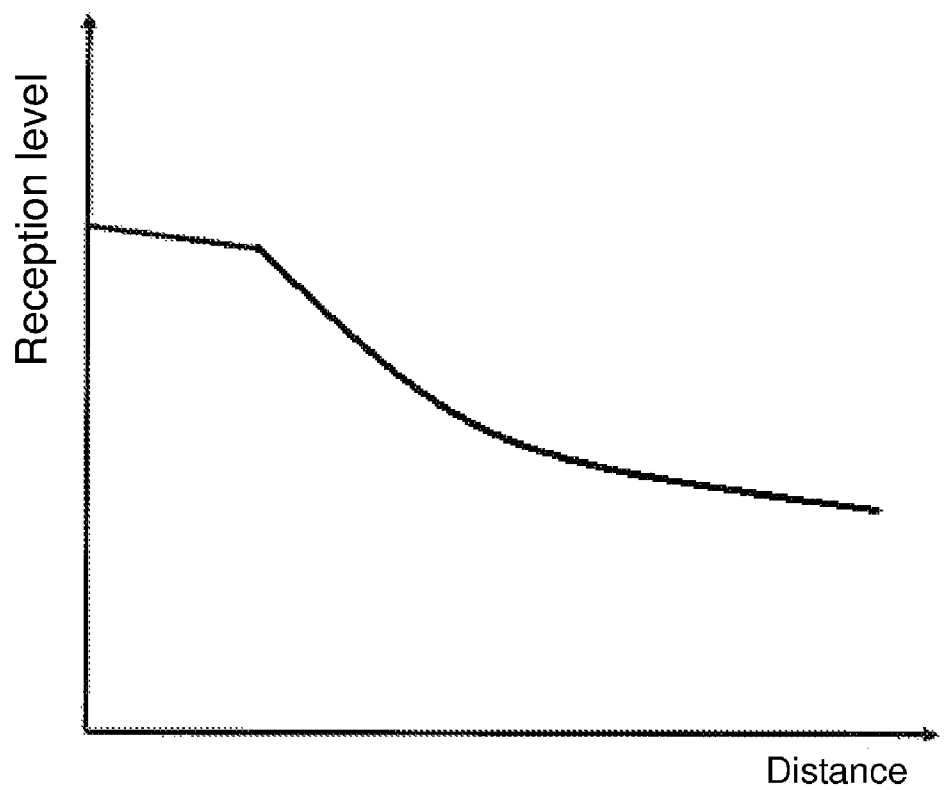

FIG. 3D shows a propagation model corresponding to a combination of each of the base stations when multiple base stations are found after the mobile station 101 searches for base stations.

When the propagation path is determined to be LOS by the LOS determination module 111, the distance-estimating module 112 estimates the distance by using the fact that the reception level decreases by a certain ratio in accordance with the distance to the base station.

Furthermore, in an embodiment, the control module 103 estimates a location of the mobile station 101 by assuming that the mobile station 101 is present. For example, when base stations are searched for by the mobile station 101 and each of the base stations 201/202/203 is found, the control module 103 may select a propagation model that corresponds to a combination of the base stations 201/202/203. In addition, the control module 103 may obtain a distance to the mobile station 101 using the combined propagation model. In this manner, the control module 103 estimates three circles with each of the base stations 201/202/203 as respective centers thereof, and uses an obtained distance to the mobile station 101 from each of the base stations 201/202/203 as a radius for each of the three circles respectively. The location of the mobile station 101 may be estimated by, for example but without limitation, assuming that the mobile station 101 is present in a region where the three circles overlap. For example, the mobile station 101 may be estimated to be present in a center of the overlapped region, and the like. In the above description, an example with three base stations has been used, but the number of base stations is not limited as long as there is more than one. Coordinates (latitude, longitude) indicating the location of each base station may be obtained from each of the base stations.

Figure 4A:
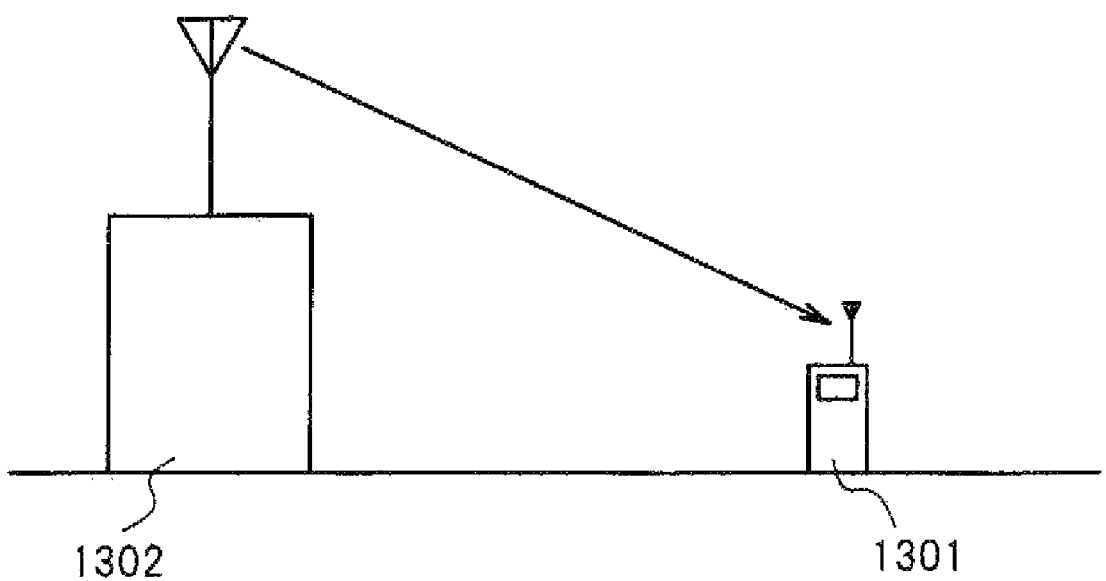
FIG. 4A illustrates an exemplary signal propagation between a mobile station and a base station under Line-Of-Sight (LOS) conditions.

FIG. 4A shows the signal propagation between a mobile station 1301 and a base station 1302 performed in the LOS. As shown in FIG. 4A, the propagation path is a straight line, if there are no obstacles in the propagation path, the distance between the mobile station 1301 and the base station 1302 may be obtained with a high accuracy.

Figure 4B:
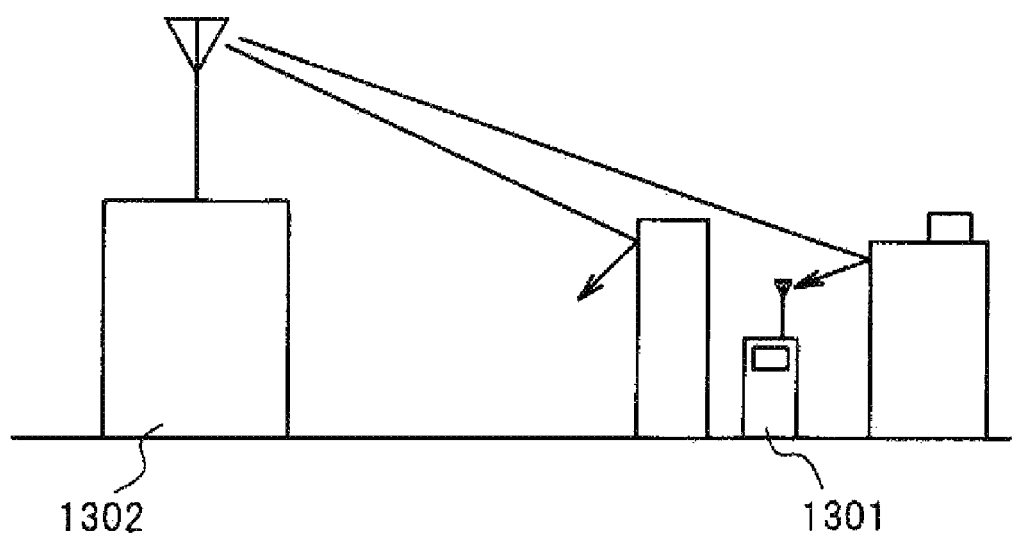
FIGS. 4B-4D illustrate exemplary signal propagations between a mobile station and a base station under NLOS conditions.
Figure 4C:
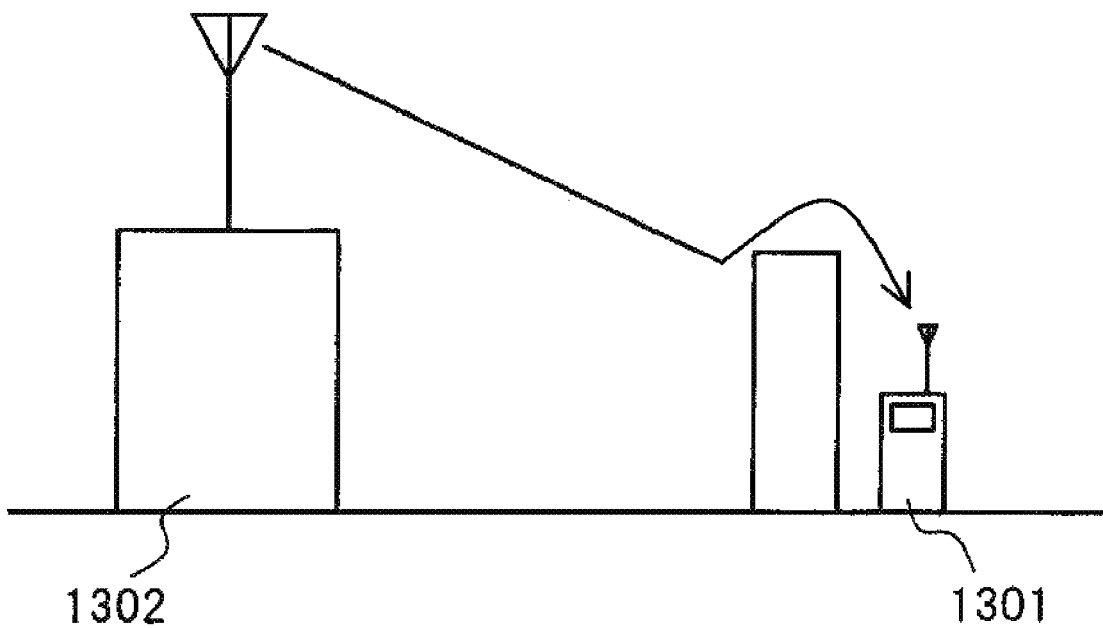
Figure 4D:
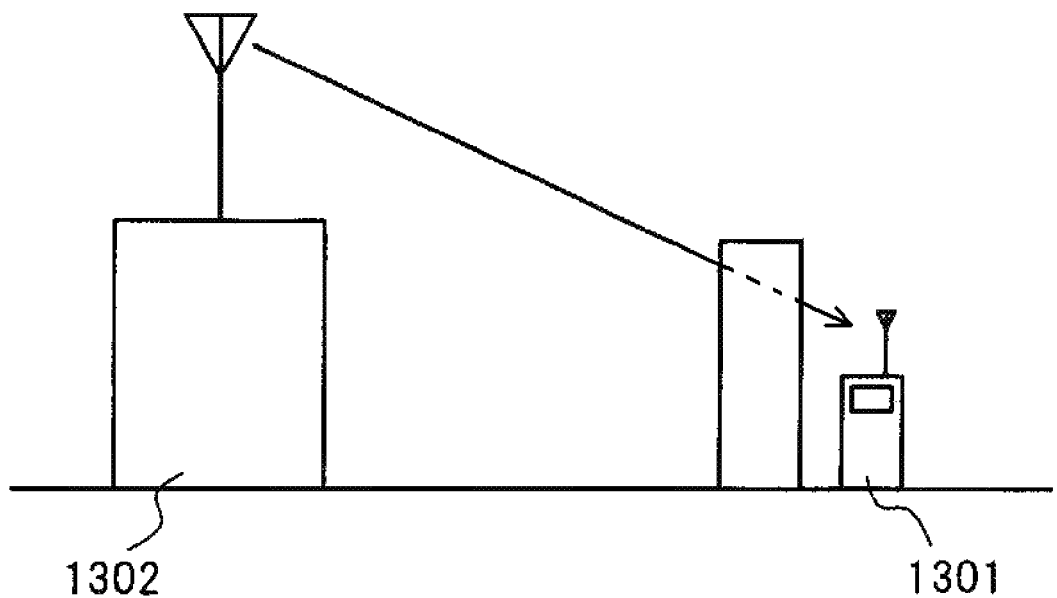

FIGS. 4B-4D show signal propagation between the mobile station 1301 and the base station 1302 performed in the NLOS. As shown in FIGS. 4B-4D the propagation path comprises obstacles, such as but without limitation, buildings and the like. FIG. 4B shows how radio waves are reflected. FIG. 4C shows how radio waves are diffracted. FIG. 4D shows how radio waves are reduced. In a case of the NLOS, the propagation path is no longer a straight line and the distance between the mobile station 1301 and the base station 1302 becomes longer than the distance between the mobile station 1301 and the base station 1302 in the case of the LOS (FIG. 4A). As a result, an accuracy of the estimation of the distance between the mobile station 1301 and the base station 1302 based on the radio field strength or propagation time becomes low.

When obstacles are present, a mobile station estimates distance with favorable accuracy by making corrections, and estimates the location of the mobile station as based on the obtained distance.

FIG. 5 illustrates an exemplary flowchart showing a location finding process 500 that can be performed by the mobile station 101 according to an embodiment of the disclosure. The various tasks performed in connection with the process 500 may be performed by software, hardware, firmware, a computer-readable medium having computer executable instructions for performing the process method, or any combination thereof. The process 500 may be recorded in a computer-readable medium such as a semiconductor memory, a magnetic disk, an optical disk, and the like, and can be accessed and executed, for example, by a computer CPU in which the computer-readable medium is stored. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. For illustrative purposes, the following description of process 500 may refer to elements mentioned above in connection with FIGS. 1-4. In practical embodiments, portions of process 500 may be performed by different elements of the mobile station 101 for estimating a location of the mobile station 101, the communication module 102, the control module 103, the storage module 104, etc. The process 500 may have functions, material, and structures that are similar to the embodiments shown in FIGS. 1-4. Therefore common features, functions, and elements may not be redundantly described here.

The process 500 may begin by, the control module 103 selecting one base station that has not previously been selected from detected base stations (task S1).

The process 500 may then continue by, the reception level signal-measuring module 109 measuring the signal level Pm (received signal strength) of the selected base station (task S2) and the reception level-estimating module 110 estimating the signal level Pr of the selected base station (task S3). The process 500 may then continue by the LOS determination module 111 determining whether the propagation path to the base station is NLOS or LOS based on a difference between the signal level Pm and the signal level Pr (inquiry task S4).

If the propagation path to the base station is determined to be NLOS (Yes branch of inquiry task S4), the distance-estimating module 112 estimates a distance based on the propagation model (task S5). If the propagation path to the base station is determined to be LOS (No branch of inquiry task S4), the distance is estimated using the fact that the reception level decreases by a certain ratio in accordance with the distance to the base station (task S6). A method of determining the location of a mobile phone under LOS conditions is explained in WO2009/041597, relevant content of which is incorporated by reference herein in its entirety.

If all of the detected base stations are selected (Yes branch of inquiry task S7), the control module 103 estimates the location (task S8), and process 500 ends. The control module 103 estimates the location by calculating circles with each of the base stations as the respective centers thereof and the estimated distance as the radius thereof. The mobile station 101 is assumed to be present in the region where the circles overlap. Otherwise (No branch of inquiry task S7), process 500 leads back to task S1.

As described above, because a mobile station estimates the distance to a base station based on a propagation model in the case of NLOS conditions, the distance between the mobile station and the base station may be accurately estimated even under NLOS conditions. Furthermore, because the location of the mobile station is estimated based on the estimated distance to the base station, the location of the mobile station may also be estimated accurately.

In this document, the terms "computer program product", "computer-readable medium", and the like may be used generally to refer to media such as, for example, memory, storage devices, or storage modules. These and other forms of computer-readable media may be involved in storing one or more instructions for use by the control module 103 to cause the control module 103 to perform specified operations. Such instructions, generally referred to as "computer program code" or "program code" (which may be grouped in the form of computer programs or other groupings), when executed, enable a location estimating method of the mobile station.

While at least one exemplary embodiment has been presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being comprised within the scope of the present disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile station comprising:
a signal-measuring module operable to measure a received signal strength of at least one signal from at least one base station to obtain a measured received signal strength;
a determining module operable to determine, based on the measured received signal strength, whether a propagation path to the at least one base station is non-line-of-sight or line-of-sight;
a distance-estimating module operable to estimate a distance to the at least one base station based on a propagation model of the at least one base station, if the propagation path is non-line-of-sight; and
a reception level-estimating module operable to estimate an ideal signal level of a signal sent to the at least one base station based on a transmission power of the at least one base station,
wherein the determining module is further operable to:
determine that the propagation path is non-line-of-sight, if a difference between the measured received signal strength and the ideal signal level exceeds a predetermined value, and
determine that the propagation path is line-of-sight, if the difference between the measured received signal strength and the ideal signal level does not exceed the predetermined value.

2. The mobile station according to claim 1, wherein the received signal strength is measured substantially simultaneously with estimating the ideal signal level.

3. The mobile station according to claim 1, further comprising a control module operable to estimate a location of the mobile station based on the distance.

4. The mobile station according to claim 3, wherein:
the distance-estimating module is further operable to estimate respective distances to each of a plurality of base stations; and
the control module is further operable to calculate:
a plurality of circles having respective locations of each of the base stations as respective centers thereof and having each of the respective distances as a radius of each of the circles respectively; and
a location of the mobile station in an overlapping region where the circles overlap.

5. The mobile station according to claim 1, further comprising a storage module operable to store the propagation model.

6. The mobile station according to claim 1, wherein the propagation model comprises reception levels of at least one of the group consisting of: reflected waves, diffracted waves, and reduced waves.

7. A method of estimating a location of a mobile station that communicates with base stations, the method comprising:
measuring a first received signal strength of a signal transmitted from a first base station to obtain a measured first received signal strength;
determining whether a first propagation path to the first base station is non-line-of-sight or line-of-sight based on the measured first received signal strength;
estimating a first distance to the first base station based on a first propagation model of the first base station, if the first propagation path is non-line-of-sight; and
estimating an ideal signal level of a signal sent to the first base station based on a transmission power of the first base station,
wherein determining whether the first propagation path to the first base station is non-line-of-sight or line-of-sight, comprises:
determining that the propagation path is non-line-of-sight, if a difference between the first received signal strength and the ideal signal level exceeds a predetermined value, and
determining that the propagation path is line-of-sight, if the difference between the first received signal strength and the ideal signal level does not exceed the predetermined value.

8. The method of estimating a location of a mobile station according to claim 7, further comprising receiving data comprising propagation models of one or more base stations from the first base station.

9. The method of estimating a location of a mobile station according to claim 7, further comprising estimating the first distance based on a combination of propagation models of the base stations, wherein each of the base stations is searched for and found by the mobile station.

10. The method of estimating a location of a mobile station according to claim 7, further comprising:
measuring a second received signal strength of a signal transmitted from a second base station to obtain a measured second received signal strength;
determining whether a second propagation path to the second base station is non-line-of-sight based on the measured second received signal strength;
estimating a second distance to the second base station based on a second propagation model of the second base station, if the second propagation path is non-line-of-sight; and
estimating the location of the mobile station based on the first distance and the second distance.

11. The method of estimating a location of a mobile station according to claim 10, wherein the second propagation model comprises reception levels of at least one of the group consisting of: reflected waves, diffracted waves, and reduced waves.

12. The method of estimating a location of a mobile station according to claim 7, wherein the first propagation model comprises reception levels of at least one of the group consisting of: reflected waves, diffracted waves, and reduced waves.

13. The method of estimating a location of a mobile station according to claim 7, further comprising:
estimating respective distances to each of a plurality of base stations;
calculating a plurality of circles having respective locations of each of the base stations as respective centers thereof and having each of the respective distances as a radius of each of the circles respectively; and
locating the mobile station in an overlapping region where the circles overlap.

14. A non-transitory computer readable medium storing computer-executable instructions that when executed perform a method for estimating a location of a mobile station, the method comprising:
measuring a received signal strength of a signal transmitted from a first base station to obtain a measured first received signal strength;
determining whether a first propagation path to the first base station is non-line-of-sight or line-of-sight based on the measured first received signal strength;
estimating a first distance to the first base station based on the propagation model of the first base station, if the first propagation path is non-line-of-sight; and
estimating an ideal signal level of a signal sent to the first base station based on a transmission power of the first base station,
wherein determining whether the first propagation path to the first base station is non-line-of-sight or line-of-sight, comprises:
determining that the propagation path is non-line-of-sight, if a difference between the first received signal strength and the ideal signal level exceeds a predetermined value, and
determining that the propagation path is line-of-sight, if the difference between the first received signal strength and the ideal signal level does not exceed the predetermined value.

15. The computer readable medium according to claim 14, wherein the method further comprises receiving data comprising propagation models of one or more base stations from the first base station.

16. The computer readable medium according to claim 14, wherein the method further comprises estimating the first distance to the first base station based on propagation models of a plurality of base stations, wherein each of the base stations is searched for and found by the mobile station.

17. The computer readable medium according to claim 14, wherein the method further comprises:
measuring a second received signal strength transmitted from a second base station to obtain a measured second received signal strength;
determining whether a second propagation path to the second base station is non-line-of-sight based on the measured second received signal strength;
estimating a second distance to the second base station based on the second propagation model related to the second base station, if the second propagation path is non-line-of-sight; and
estimating the location of the mobile station based on the first distance and the second distance.

* * * * *